United States Patent
Fukumoto

(10) Patent No.: US 8,479,792 B2
(45) Date of Patent: Jul. 9, 2013

(54) MOTORCYCLE TIRE AND METHOD FOR MANUFACTURING THE SAME

(75) Inventor: Toru Fukumoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 652 days.

(21) Appl. No.: 12/632,443

(22) Filed: Dec. 7, 2009

(65) Prior Publication Data

US 2010/0206450 A1    Aug. 19, 2010

(30) Foreign Application Priority Data

Feb. 16, 2009    (JP) .................................. 2009-032996

(51) Int. Cl.
*B60C 9/22* (2006.01)
*D02G 3/48* (2006.01)

(52) U.S. Cl.
USPC ................ 152/527; 152/451; 57/237; 57/902

(58) Field of Classification Search
USPC ..................... 57/237, 902; 152/451, 526, 527
IPC ......... D02G 3/48; D07B 1/06; B60C 9/18,9/20, B60C 9/22
See application file for complete search history.

(56) References Cited

U.S. PATENT DOCUMENTS

| 5,562,792 A * | 10/1996 | Caretta .......................... 156/117 |
| 2004/0069394 A1 | 4/2004 | Armellin et al. |
| 2007/0144648 A1 * | 6/2007 | Sinopoli et al. ............... 152/527 |

FOREIGN PATENT DOCUMENTS

| EP | 1 097 824 A2 | 5/2001 |
| EP | 1284318 A1 | 2/2003 |
| EP | 2065226 A1 | 6/2009 |
| JP | 2004-9760 A | 1/2004 |

OTHER PUBLICATIONS

Extended European Search Report dated May 27, 2010 in related European Application No. 09016066.4.

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A motorcycle tire comprises: a toroidal carcass comprising two carcass plies of cords arranged at an angle of from 20 to 80 degrees with respect to the tire circumferential direction; and a band comprising at least one ply of at least one helically wound cord disposed radially outside the carcass. The band cord is made of steel filaments of 0.08 to 0.20 mm diameter twisted together into a L×M×N structure. The band cord has a low tensile elastic modulus range and a high tensile elastic modulus range, wherein an inflection point between the low tensile elastic modulus range and the high tensile elastic modulus range lies between 2% elongation and 7% elongation of the cord, and a tensile force required to cause 2% elongation of the band cord is not more than 60 Newton.

9 Claims, 4 Drawing Sheets

MOTORCYCLE TIRE AND METHOD FOR MANUFACTURING THE SAME

BACKGROUND OF THE INVENTION

The present invention relates to a pneumatic tire, more particularly to a motorcycle tire provided with a tread reinforcing band suitable for running on rough terrains.

In general, a motorcycle tire for rough terrain is inflated to a tire pressure of 80 to 120 kPa when running on rough terrain, which pressure is relatively low in comparison with tire pressure of the on-road tires.
Therefore, the carcass of this kind of motorcycle tires is provided with a bias structure or a semi-radial structure comprising two cross plies of carcass cords in order to provide rigidity for the tire itself.

Conventionally, the tread portion of such bias or semi-radial tire is provided with a breaker comprising two cross plies of parallel cords laid at angles of from 20 to 50 degrees with respect to the tire circumferential direction.

In European patent application publication No. EP-1097824-A2, a motorcycle radial tire for on-road use is disclosed, wherein, instead of a type of the above-mentioned breaker, the tread portion is provided with a spiral band made of spirally wound steel cords. The steel cord is composed of waved steel filaments and non-waved steel filaments twisted together into a L×M structure (L, M: integers) such as 3×3 structure so that the cord has a variable tensile elastic modulus continuously increasing from its zero elongation to 1.0% elongation.

In the case of a carcass having a bias structure or semi-radial structure, so called vulcanization stretch of the carcass during tire vulcanization becomes large in comparison with a radial carcass structure. In other words, the outer diameter of the carcass at the tire equator becomes increased or the circumferential length of the carcass becomes increased more than the radial carcass structure.
As a result, if the above-mentioned spiral band is used in a tire having a carcass of a bias structure or semi-radial structure, then the elongation of the spiral band in the tire circumferential direction becomes insufficient for the vulcanization stretch, which results in defective molding or breakage of the band cord. Thus, it is difficult to manufacture the motorcycle tire acceptable in the marketplace.
Otherwise, the hoop effect of the band becomes insufficient, and as a result, the rigidity of the tread portion can not be increased and good steering stability can not be obtained. Further, the high-speed durability is deteriorated.

A breaker can increase the tread rigidity totally, but it is inferior in the effect to increase the circumferential rigidity when compared with a spiral band.
If the circumferential rigidity of the tread portion is increased, then the traction of the tire during accelerating the motorcycle can be improved.

On the other hand, as disclosed in EP-1097824-A2, if waved steel filaments are used in order to achieve a special cord characteristic, the resultant steel cord has a tendency that the twist structure of the cord alone becomes unstable, and it becomes hard to deal with during building a raw tire.

Further, if a spiral band is incorporated in a motorcycle tire for rough terrain used under a relatively low tire pressure, since the band cord extends almost parallel with the tire circumferential direction, the band cord is subjected to a large bending deformation repeatedly during running and at the time of getting over protrusions.

Therefore, in comparison with a motorcycle tire for on-road use as disclosed in EP-1097824-A2, a larger fatigue resistance to bending deformation and a larger rupture strength are necessary.

SUMMARY OF THE INVENTION

It is therefore, an object of the present invention to provide a motorcycle tire in which, by employing very fine steel filaments and a L×M×N structure on a steel cord for the spiral band, the band cord is provided with a special elongation characteristic and a necessary fatigue resistance and rupture strength, and it becomes possible to combine a spiral band with a carcass of a bias structure or semi-radial structure, to achieve increased traction during accelerating without causing the above-mentioned drawbacks.

According to the present invention, a motorcycle tire comprises a tread portion, a pair of sidewall portions, a pair of bead portions, a toroidal carcass extending between the bead portions through the tread portion and sidewall portions, and a band disposed radially outside the carcass in the tread portion, wherein
the carcass comprises at least two carcass plies of carcass cords arranged at an angle of from 20 to 80 degrees with respect to the tire circumferential direction, and
the band is made of at least band cord helically wound into at least one ply or layer.

The above-mentioned band cord is a steel cord formed by: first twisting a plural number L of steel filaments together into a primary strand; second twisting a plural number M of the primary strands together into a second strand; and final twisting a plural number N of the second strands together into the steel cord, wherein each of the steel filaments has a filament diameter (d) of from 0.08 to 0.20 mm, The above-mentioned steel cord has a low tensile elastic modulus range and a high tensile elastic modulus range, wherein the tensile elastic modulus of the steel cord in the low tensile elastic modulus range is lower than the tensile elastic modulus of the steel cord in the high tensile elastic modulus range, an inflection point between the low tensile elastic modulus range and the high tensile elastic modulus range lies between 2% elongation and 7% elongation of the steel cord, and a tensile force required to cause 2% elongation of the steel cord is not more than 60 Newton.

The above-mentioned low tensile elastic modulus range exists between zero elongation and the elongation at the inflection point, and the high tensile elastic modulus range exists between the elongation at the inflection point and a breaking elongation of the steel cord.

DESCRIPTION OF THE PREFERRED EMBODIMENTS

Figure 1:
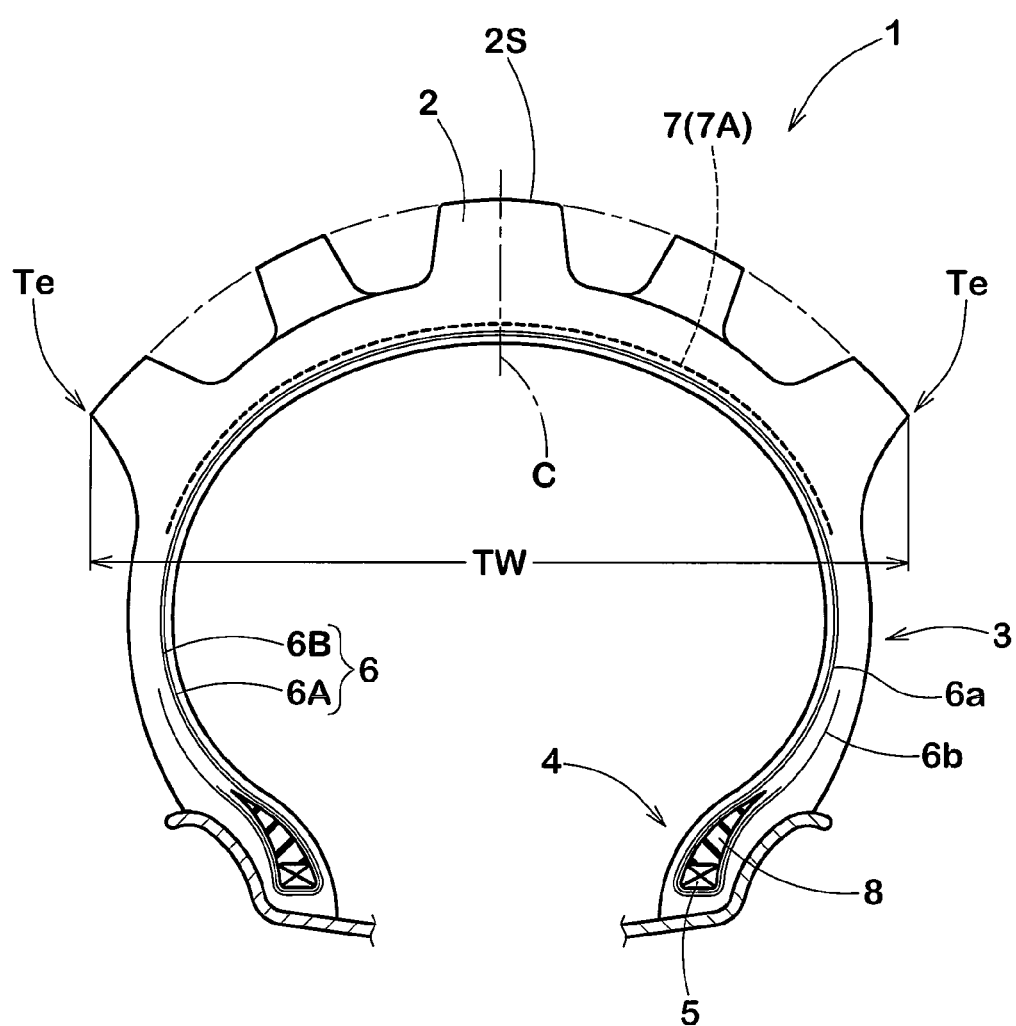
FIG. 1 is a cross sectional view of a motorcycle tire according to the present invention.

An embodiment of the present invention will now be described in detail in conjunction with accompanying drawings.

In the drawings, motorcycle tire 1 according to the present invention is designed for use on rough terrain at a relatively lower tire pressure of about 80 to 120 kPa.

The motorcycle tire 1 comprises a tread portion 2, a pair of sidewall portions 3, a pair of bead portions 4 each with a bead core 5 therein, a carcass 6 of a bias structure or a semi-radial structure extending between the bead portions 4 through the tread portion 2 and sidewall portions 3, and a band 7 disposed radially outside the carcass 6 in the tread portion 2. However, a breaker is not provided.

Incidentally, as well known in the tire art, a band and breaker are tread reinforcing cord layers, the fundamental difference therebetween resides in the cord angle. That is, the cord angle of the band is substantially zero, namely in a range of from 0 to about 5 degrees with respect the tire circumferential direction. The cord angle of the breaker is larger than that of the band, for example, in a range of 20 to 50 degrees with respect to the tire circumferential direction.

In order to enable cornering with a large bank angle, the tread face 2S of the tread portion 2 is convexly curved, while extending from one of the tread edges Te to the other through the tire equator C, and the maximum cross section width of the tire which corresponds to the tread width TW, lies between the tread edges Te.

The carcass 6 is composed of at least two plies of carcass cords, wherein the carcass cords in each ply are arranged at an angle in a range of from 20 to 80 degrees with respect to the tire circumferential direction so that the carcass cords in each ply become crosswise to those in the next ply(plies) in order to increase the carcass rigidity and thereby to provide necessary rigidity especially a large lateral stiffness for the tire used under relatively lower tire pressure. The carcass 6 in this embodiment 2 is made up of only two carcass plies 6A and 6B.

From the standpoint of steering stability on rough terrain, it is preferable that the cord angle of the carcass cords in each ply is not more than 75 degrees, more preferably not more than 70 degrees, still more preferably not more than 67 degrees, but preferably not less than 50 degrees with respect to the tire circumferential direction.

Organic fiber cords, e.g. nylon, rayon, polyester and the like can be suitably used for the carcass cords. In this embodiment, nylon cords are used.

Each of the carcass plies 6A and 6B extends between the bead portions 4 through the tread portion 2 and sidewall portions 3, and turned up around the bead core 5 in each of the bead portions 4 from the axially inside to the axially outside of the tire so as to form a pair of turned up portions 6b and a toroidal main portion 6a therebetween.

Between the main portion 6a and each of the turned up portions 6b, a bead apex 8, which is made of a hard rubber and extends radial outwardly from the bead core 5 in a tapered manner, is disposed in order to reinforce the bead portion 4.

The band 7 is made of at least one band cord helically wound around the carcass into at least one layer or ply 7A (in this embodiment, wound into a single ply 7A).

Figure 2:
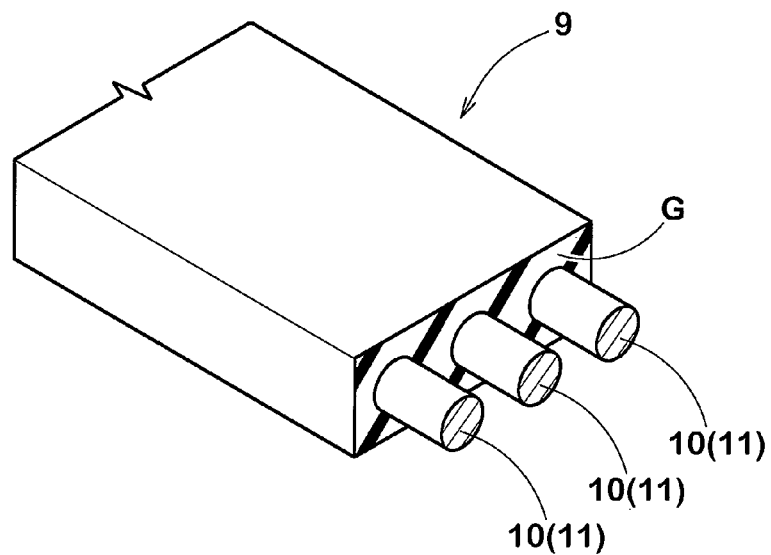
FIG. 2 is a perspective view of the band cords embedded in topping rubber in a form of a rubber tape which is helically wound into the band.

During building a raw tire, in order to improve the production efficiency of the band, for example as shown in FIG. 2, a tape 9 of topping rubber G in which a plurality of band cords are embedded along the length thereof in parallel with each other, can be wound a number of times into the band. The number of the embedded band cords is preferably from 2 to 5. But, it is also possible to use such a tape 9 in which a single band cord is embedded.

According to the present invention, the band cord 10 is a steel cord 11 having a L×M×N structure.

The L×M×N structure is a twist structure such that a number L of steel filaments (f) are first twisted together into a primary strand 12, a number M of the primary strands 12 are second twisted together into a second strand 13, and the number N of the second strands 13 are final twisted into the steel cord 11.

As to the steel filament (f), a very thin filament having a filament diameter (d) of from 0.08 to 0.20 mm is used.

The numbers L, M and N are preferably set in a range of from 2 to 4.

Figure 3:
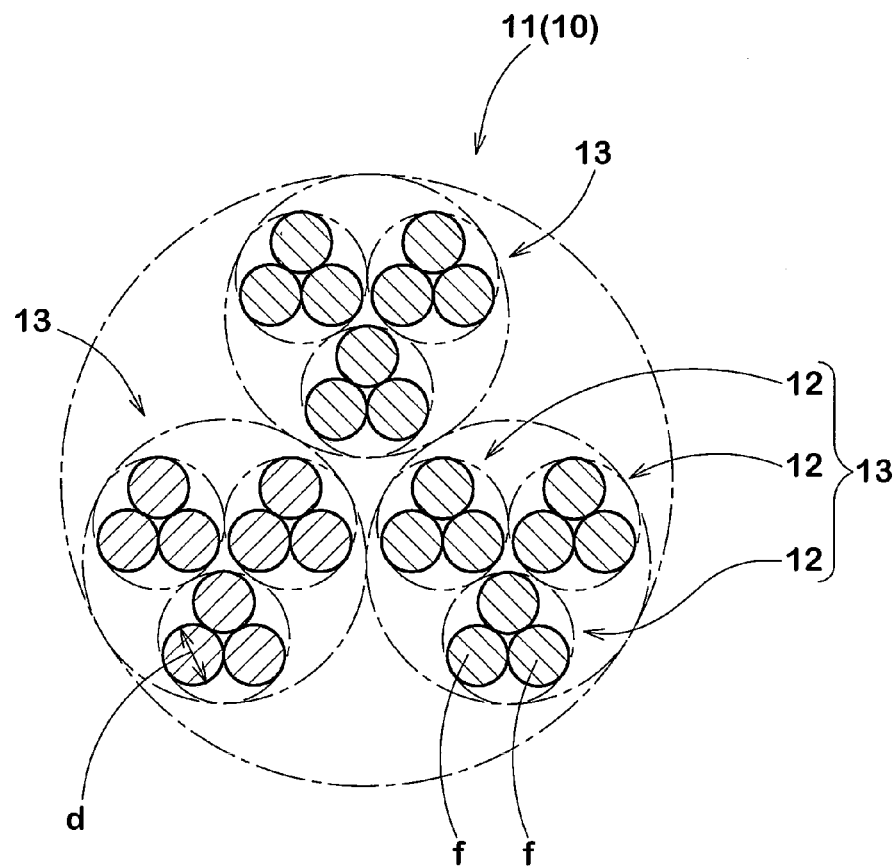
FIG. 3 is a cross sectional view diagrammatically showing the L×M×N structure when L=M=N=3.

FIG. 3 shows an example where L=M=N=3, namely, 3×3×3 structure. And all of the steel filaments have substantially same filament diameter (d). This structure is especially preferable for stabilizing the twist structure.

If the numbers L, M or N are less than 2, namely, 1, then it becomes difficult to achieve the undermentioned elongation characteristic. If more than 4, then undesirable weight increase of the cord is caused.

In the steel cord 11 formed by the first and second strands, due to its highly twisted structure, the initial stage elongation of the cord becomes large in comparison with conventional cords.

Figure 4:
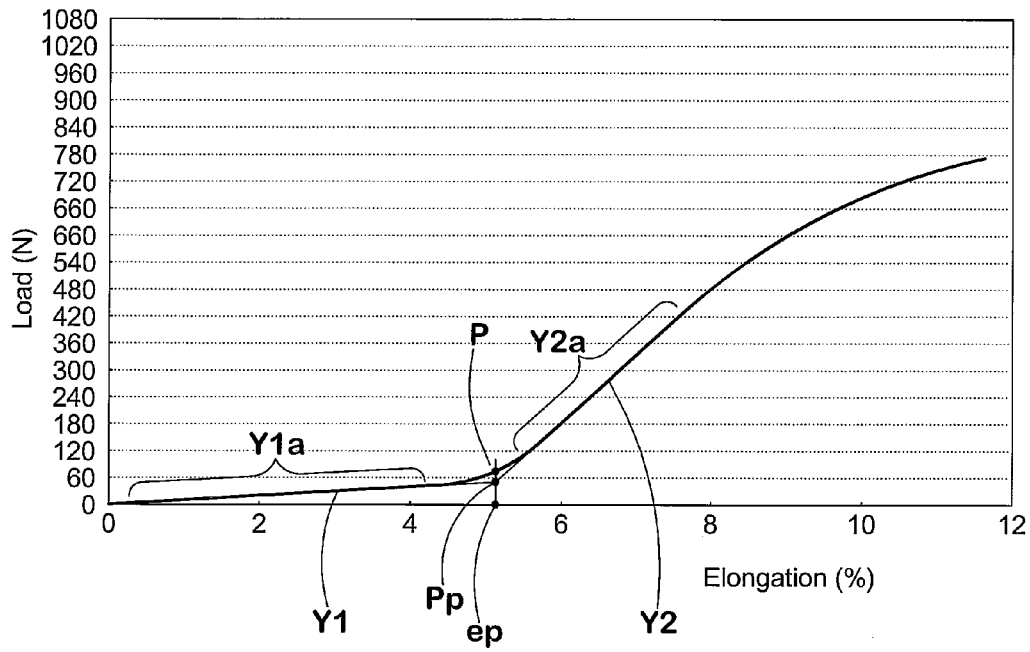
FIG. 4 is a graph showing an example of the load-elongation curve of the band cord.

Therefore, the steel cord 11 is provided with an elongation characteristic which shows two linear parts as shown in FIG. 4. That is, the load-elongation curve of the steel cord 11 is provided with: a low tensile elastic modulus range Y1 extending from the point of origin 0 to a point near an inflection point P; and a high tensile elastic modulus range Y2 extending from a point near the inflection point P towards the upper limit or rupture point.

Further, the inflection point P is sifted towards the high elongation side. As a result, in the low tensile elastic modulus range Y1, the tensile elastic modulus is limited to very small values.

Here, the inflection point P is defined as the intersecting point between the load-elongation curve and a straight line which is drawn parallel to the axis of cord load from an intersecting point Pp between an extended line of a linear part Y1a of the load-elongation curve in the low tensile elastic modulus range Y1 and an extended line of a linear part Y2a of the load-elongation curve in the high tensile elastic modulus range Y2.

Here, the load-elongation curve is that obtained by plotting values of both of the load and elongation in linear or proportional scales.

Such characteristics are derived from the above-mentioned twisting structure, therefore, in comparison with pre-shaping (waving) of steel filaments, the elongation characteristics and structure of the cord become more stabilized.

In order to further sift the inflection point P towards the high elongation side, it is desirable that the twist pitch length P3 of the final twist is larger than the twist pitch length P2 of the second twist which is larger than the twist pitch length P1 of the first twist. (P1<P2<P3)

When the filament diameter (d) is less than 0.08 mm, even if the total number of the filaments is increased, it becomes difficult to provide a necessary rupture strength for the cord. If the filament diameter (d) is more than 0.20 mm, the inflection point P approaches the point of origin or zero elongation, the advantageous effects of high elongation can not be obtained. Therefore, the filament diameter (d) is not less than 0.08 mm, but not more than 0.20 mm.

It is important that, as shown in FIG. 4, the elongation (ep) at the inflection point P is set in a range of not less than 2.0%, preferably not less than 3.0%, more preferably not less than 3.5%, but not more than 7.0%, preferably not more than 6.0%, more preferably not more than 5.5%. and that the load F of the cord at 2% elongation, namely a tensile force required to cause 2% elongation of the steel cord, is not more than 60 N, preferably not more than 50 N, more preferably not more than 45 N, still more preferably not more than 30 N, but not less than 5 N, preferably not less than 10 N.

The reason therefor is that: in the case of a bias or semi-radial carcass structural, in comparison with a radial carcass structure, the vulcanization stretch becomes larger, and a band cord is subjected to a tensile force of up to about 60 N. Therefore, if the elongation (ep) at the inflection point P is small, then the elongation of the band cord during tire vulcanization lies in the high tensile elastic modulus range Y2. As a result, the vulcanization stretch becomes insufficient for pressing the tire onto the inner surface of the mold, which results in defective molding. when subjected to a tensile force of about 60 N, if the elongation is small, there is the same problem of defective molding. Otherwise, the band cord is broken.

If the elongation at the inflection point P is too large, on the other hand, the tension of the band cord 10 in the vulcanized tire in service conditions can not reach to the high tensile elastic modulus range Y2, therefore, the band can not present its function well. As a result, the tire rigidity and responsiveness of the tire are deteriorated, and it becomes difficult to improve the steering stability and traction during accelerating.

It is further preferable that the load F of the cord at 3% elongation is not more than 120 N, more preferably not more than 60 N. The elongation of the cord 10 at a load of 60N is in a range of from 2.5 to 5.5%. From zero % elongation to about 3% elongation, the tensile elastic modulus is constant, namely, the load-elongation curve is linear.

In the band ply 7A, it is preferable that the cord count is set in a range of from 15 to 50 cords per 5 cm ply width.

Figure 6:
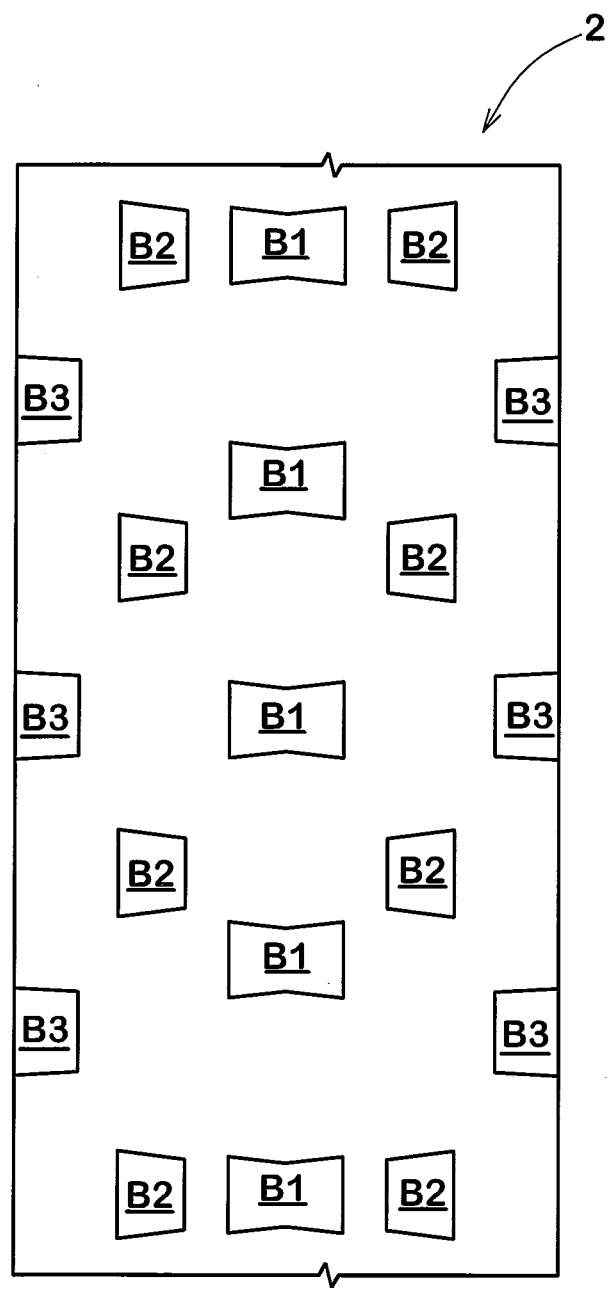
FIG. 6 a developed view of a part of the tread portion showing an example of the tread pattern.

In this embodiment, as shown in FIG. 6, the tread portion 2 is provided with a block pattern made up of a plurality of blocks B having almost rectangular top faces.

The blocks B in this example include: a single circumferential row of relatively large-sized central blocks B1; a pair of axially outer most circumferential rows of shoulder blocks B3; and a pair of circumferential rows of intermediate blocks B2. The central blocks B1 are arranged circumferentially at substantially constant pitch lengths. The intermediate blocks B2 and shoulder blocks B3 are arranged circumferentially at substantially constant pitch lengths which are smaller than the pitch lengths of the central blocks B1.

The tread pattern is not limited to this pattern, but a block pattern is preferred.

In either case, the land/sea ratio of the tread pattern is preferably set in a range of from 10 to 50%.

The land/sea ratio (L/S) is, as well known in the art, the ratio of the land area (ground contacting area) to the sea area (non-contacting area) of the tread portion 2.

In this particular case, the land area (L) is the total area of the top faces of the blocks B1, B2 and B3. The sea area (S) is equal to the overall area of the tread portion minus the land area (L).

In the meantime, the above-mentioned motorcycle tire 1 is manufactured as follows:

The raw tire is built by assembling raw materials which include the raw carcass, the raw band, unvulcanized rubber members such as tread rubber, sidewall rubber, bead rubber and bead apex, and the rest.

The raw tire put in a mold and vulcanized by heating the raw tire and pressurizing the inside of the raw tire.

In the building of the raw tire, the carcass is shaped in a toroidal shape, and the unvulcanized band is formed by helically winding the above-mentioned unvulcanized topping rubber tape on the radially outside of the toroidally-shaped carcass.

Comparison Tests

Test tires of size 90/100-21 (rim size 19×2.15) having the tire structure shown in FIG. 1 were prepared, using band cords having specifications shown in Table 1, and each test tire was tested for the traction during accelerating, steering stability and durability.

Except for the band cords. all of the test tires had the same structure and specifications as follows.

<Carcass> number of plies: two cord angle: +65 and −65 degrees cord material: nylon cord structure: 2100 dtex/2 cord count: 30/5 cm

<Band> number of ply: shown in Table 1 band cord: shown in Table 1 cord angle: almost zero cord count: 25/5 cm

Figure 5:
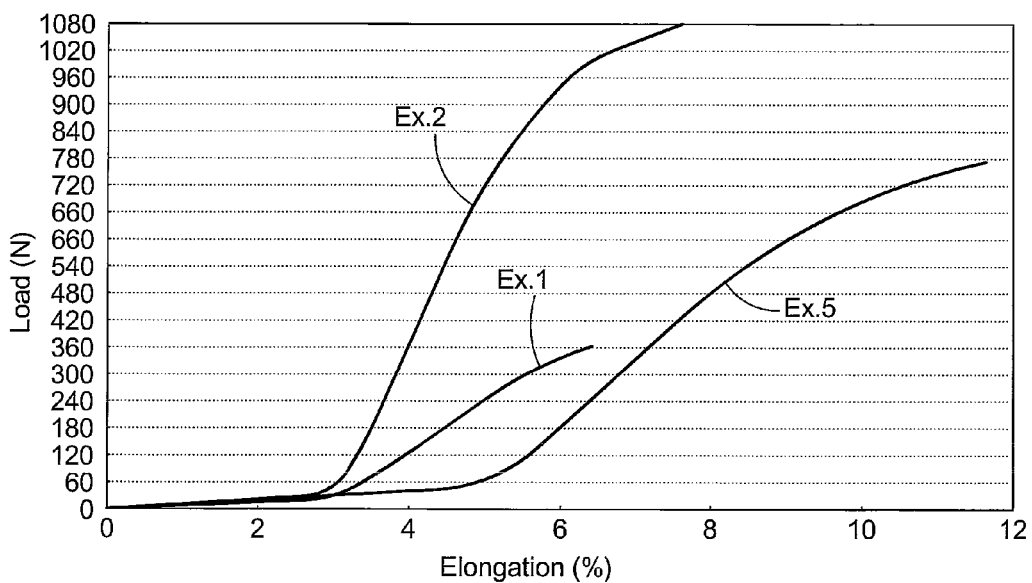
FIG. 5 is a graph showing load-elongation curves of band cords of the undermentioned test tires Ex.1 to Ex.3 shown in Table 1.

The load-elongation curves of the band cords used in the test tires Ex.1-Ex.3 are shown in FIG. 5.

(1) Traction during accelerating and steering stability test: A 250 cc motorcycle provided on the rear wheel with the test tire inflated to 80 kPa was run on rough terrain prepared in a tire test course, and the test rider evaluated the traction during accelerating and steering stability (based on damping performance, cornering performance, etc) into five ranks on the basis of the tire Ref.1 being rank three, wherein the larger rank number is better.

(2) Durability: The above-mentioned motorcycle was run on the rough terrain test course for 4 hours. Then, the tire was disassembled and visually inspected whether the band cord was broken or not.

The test result are shown in Table 1.

From the test results, it was confirmed that the traction during accelerating and steering stability can be improved without deterioration of the cord durability and defective molding.

TABLE 1

| Tire | Ref. 1 | Ref. 2 | Ref. 3 | Ref. 4 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|---|
| Breaker | | | | | | | | | | | | | |
| Number of ply | 2 | 0 | 0 | 0 | 0 | 0 | 0 | 0 | 0 | 0 | 0 | 0 | 0 |
| Structure *1 | CP | — | — | — | — | — | — | — | — | — | — | — | — |
| Band | | | | | | | | | | | | | |
| Number of ply | 0 | 1 | 1 | 1 | 1 | 1 | 1 | 1 | 1 | 1 | 1 | 1 | 1 |
| Structure *1 | — | HW | HW | HW | HW | HW | HW | HW | HW | HW | HW | HW | HW |
| Band (Breaker) cord | | | | | | | | | | | | | |
| Material | aramid | steel | steel | steel | steel | steel | steel | steel | steel | steel | steel | steel | steel |
| Structure | 1670dtex/2 | 3 × 3 × 3 | 3 × 3 × 3 | 3 × 3 × 3 | 3 × 3 × 3 | 3 × 3 × 3 | 3 × 3 × 3 | 3 × 3 × 3 | 3 × 3 × 3 | 3 × 3 × 3 | 3 × 3 × 3 | 2 × 2 × 2 | 2 × 3 × 2 |
| Filament diameter (d) (mm) | — | 0.22 | 0.15 | 0.15 | 0.08 | 0.15 | 0.2 | 0.15 | 0.15 | 0.15 | 0.15 | 0.15 | 0.08 |
| Twist pitch (mm) (P1/P2/P3) | — | 4.9/ 7.2/ 14.4 | 2.7/ 4.0/ 12 | 2.7/ 3.5/ 3.5 | 1.7/ 2.5/ 5.0 | 2.7/ 4.0/ 8.0 | 4.3/ 6.4/ 12.8 | 2.7/ 4.0/ 10.0 | 2.7/ 4.0/ 5.0 | 2.7/ 4.0/ 4.0 | 1.7/ 2.5/ 5.0 | 2.7/ 4.0/ 8.0 | 1.7/ 2.5/ 5.0 |
| Load at 2% elongation (N) | 120 | 73 | 26 | 8 | 5 | 16 | 60 | 20 | 12 | 10 | 25 | 10 | 5 |
| Elongation at Inflection point (%) | — | 3.1 | 1.5 | 8.0 | 6.0 | 3.7 | 3.1 | 2.0 | 5.0 | 7.0 | 4.0 | 3.0 | 6.5 |
| Steering stability | 3 | — | 2.5 | 2.8 | 4.5 | 4.5 | 3.5 | 3.5 | 3.5 | 3.5 | 3.5 | 3.5 | 4.0 |
| Traction during accelerating | 3 | — | 2.0 | 2.8 | 4.5 | 4.0 | 3.5 | 3.5 | 4.0 | 4.0 | 4.0 | 3.5 | 3.5 |
| Durability (cord broken?) | no | — | yes | no | no | no | no | no | no | no | no | no | no |
| Problem during vulcanization | non | *2 | non | non | non | non | non | non | non | non | non | non | non |

*1 CP: conventional cut ply HW: helically wound tape
*2 Due to insufficiency of the vulcanization stretch of the carcass, the tire could not be molded.

The invention claimed is:

1. A motorcycle tire comprising a tread portion, a pair of sidewall portions, a pair of bead portions, a toroidal carcass extending between the bead portions through the tread portion and sidewall portions, and a band disposed radially outside the carcass in the tread portion, wherein
said tread portion has a tread face which is convexly curved while extending from one of tread edges to the other so that the maximum section width of the tire lies between the tread edges,
said carcass comprises at least two cross plies of carcass cords arranged at an angle of from 20 to 80 degrees with respect to the tire circumferential direction,
said band comprises at least one band ply of at least one helically wound band cord, and
said band cord is a steel cord made up of a plural number N of second strands which are final twisted together, each of the second strands is made up of a plural number M of primary strands which are second twisted together, each of the primary strands is made up of a plural number L of steel filaments which are first twisted together, and each of the steel filaments has a filament diameter (d) of from 0.08 to 0.20 mm,
wherein the steel cord has a low tensile elastic modulus range and a high tensile elastic modulus range, wherein the tensile elastic modulus of the steel cord in the low tensile elastic modulus range is lower than the tensile elastic modulus of the steel cord in the high tensile elastic modulus range, an inflection point between the low tensile elastic modulus range and the high tensile elastic modulus range lies between 2% elongation and 7% elongation of the steel cord, said inflection point is the intersecting point between the load-elongation curve and a straight line drawn parallel to the axis of cord load from an intersecting point Pp between an extended line of the first linear part Y1a and an extended line of the second linear part Y2a, and a tensile force required to cause 2% elongation of the steel cord is not more than 60 Newtons, the low tensile elastic modulus range exists between zero elongation and the elongation at the inflection point, and the high tensile elastic modulus range exists between the elongation at the inflection point and a breaking elongation of the steel cord, and
wherein the steel cord has an elongation characteristic which shows two definite linear parts in a load-elongation curve of the steel cord obtained by plotting values of both of the load and elongation in linear scales, the two linear parts are a first linear part Y1a in the low tensile elastic modulus range Y1 and a second linear part Y2a in the high tensile elastic modulus range Y2.

2. The motorcycle tire according to claim 1, wherein said numbers L, M and N is in a range of from 2 to 4.

3. The motorcycle tire according to claim 1 or 2, wherein the twist pitch length P1 of the first twist is smaller than the twist pitch length P2 of the second twist which is smaller than the twist pitch length P3 of the final twist.

4. The motorcycle tire according to claim 1, wherein the twist pitch length P1 of the first twist is smaller than the twist pitch length P2 of the second twist which is smaller than the twist pitch length P3 of the final twist, and said numbers L, M and N are 3.

5. The motorcycle tire according to claim 1, wherein said at least one band cord is embedded in a tape of a topping rubber, and said band is made up of a plurality of windings of said tape.

6. The motorcycle tire according to claim 5, wherein the number of said at least one band cord embedded in the tape is in a range of from 2 to 6.

7. The motorcycle tire according to claim 1, wherein said tensile force is not more than 30 Newtons.

8. The motorcycle tire according to claim 1, wherein said inflection point lies between 3% elongation and 5.5% elongation.

9. The motorcycle tire according to claim 1, wherein none of the steel filaments were pre-shaped.

* * * * *